(12) United States Patent
Chen et al.

(10) Patent No.: US 8,536,789 B2
(45) Date of Patent: Sep. 17, 2013

(54) HEAD LIGHT FOR A MOTOR VEHICLE

(75) Inventors: Pao Hsu Chen, Milpitas, CA (US); Luis Sampedro Diaz, Mountain View, CA (US); Arne Stoschek, Palo Alto, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 604 days.

(21) Appl. No.: 12/651,534

(22) Filed: Jan. 4, 2010

(65) Prior Publication Data

US 2011/0163671 A1 Jul. 7, 2011

(51) Int. Cl.
*B60Q 1/02* (2006.01)
(52) U.S. Cl.
USPC .................................. 315/82; 315/77; 315/81
(58) Field of Classification Search
USPC .................. 315/77, 81, 82; 362/2, 459, 509, 362/510, 511, 514, 516, 475, 476, 507
See application file for complete search history.

(56) References Cited

U.S. PATENT DOCUMENTS

| 5,408,321 | A  | * | 4/1995 | Paulson, Jr. | 356/366 |
| 7,150,552 | B2 | * | 12/2006 | Weidel | 362/545 |
| 7,222,999 | B2 | * | 5/2007 | Eschler et al. | 362/510 |

FOREIGN PATENT DOCUMENTS

| DE | 69933917 T2 | 9/2007 |
| WO | 2007122544 | 11/2007 |

OTHER PUBLICATIONS

German Search Report, German patent application No. 10 2010 055 128.7, 4 pages, Sep. 26, 2011.
Kauschke, R., "Systematic of the Active Headlamp Design", Proceedings of the 7th International Symposium on Automotive Lighting, 5 pages, 2007.

* cited by examiner

*Primary Examiner* — Douglas W Owens
*Assistant Examiner* — Jianzi Chen
(74) *Attorney, Agent, or Firm* — King & Spalding L.L.P.

(57) ABSTRACT

A head light for a motor vehicle has a light source for generating a beam of light as well as a electronic beam steering module for steering the beam of light and/or a electronic beam shaping module for shaping the beam of light, wherein the head light has a light filter for eliminating at least the substantial portion of red light from the light generated by means of the light source.

21 Claims, 4 Drawing Sheets

HEAD LIGHT FOR A MOTOR VEHICLE

TECHNICAL FIELD

The invention relates to a head light for a motor vehicle, wherein the head light comprises a light source for generating a beam of light and a electronic beam steering module for steering the beam of light and/or a electronic beam shaping module for shaping the beam of light.

BACKGROUND

Such a head light is disclosed in WO 2007/122544 A1, wherein an AFS (adaptive front lighting system) for a vehicle comprises a LC (Liquid Crystal) Element which is arranged such that it receives light emitted by a light source, wherein the LG Element in a first state allows light to pass substantially unaffected and in a second state diffracts passing light.

Therefore, there exists a need for an improved head light and an improved AFS, respectively. Furthermore, a need exists to prevent or to decrease or to considerably decrease chromatic dispersion, such as a "fraying", of the light cone.

SUMMARY

According to an embodiment, a head light for a motor vehicle may comprise a light source for generating a beam of light; at least one of an electronic beam steering module for steering the beam of light and an electronic beam shaping module for shaping the beam of light; and a light filter for eliminating at least the substantial portion of red light from the light generated by the light source.

According to a further embodiment, the electronic beam steering module may have a performance wavelength which lies between the wavelength of green light and the wavelength of blue light. According to a further embodiment, the electronic beam steering module may have a performance wavelength which lies centered between the wavelength of green light and the wavelength of blue light. According to a further embodiment, the electronic beam shaping module may have a performance wavelength which lies between the wavelength of green light and the wavelength of blue light. According to a further embodiment, the electronic beam shaping module may have a performance wavelength which lies centered between the wavelength of green light and the wavelength of blue light. According to a further embodiment, the electronic beam steering module may have a performance wavelength which lies between 490 nm and 520 nm. According to a further embodiment, the electronic beam shaping module may have a performance wavelength which lies between 490 nm and 520 nm.

According to another embodiment, a head light for a motor vehicle may comprise a light source for generating a beam of light; and at least one of: an electronic beam steering module for steering the beam of light and an electronic beam shaping module for shaping the beam of light; wherein the electronic beam steering module or the electronic beam shaping module has a performance wavelength which lies between the wavelength of green light and the wavelength of blue light.

According to a further embodiment, the electronic beam steering module or the electronic beam shaping module may have a performance wavelength which lies centered between the wavelength of green light and the wavelength of blue light. According to a further embodiment, the electronic beam steering module or the electronic beam shaping module may have a performance wavelength which lies between 490 nm and 520 nm.

According to yet another embodiment, head light for a motor vehicle may comprise a light source for generating a beam of light; a electronic beam steering module for steering the beam of light; wherein the electronic beam steering module has a performance wavelength which lies between 490 nm and 520 nm; and an electronic beam shaping module for shaping the beam of light; wherein the electronic beam shaping module has performance wavelength which lies between 490 nm and 520 nm.

According to yet another embodiment, a head light for a motor vehicle may comprise a first light source for generating a first beam of light of a first color; a second light source for generating a second beam of light of a second color; at least one of: an electronic beam steering module for steering the first beam of light and the second beam of light and an electronic beam shaping module for shaping the first beam of light and the second beam of light; and a control for such an activation of the first light source and the second light source that the first beam of light and the second beam of light are generated alternating.

According to a further embodiment, the electronic beam steering module can be activated by means of the control such that it steers the first beam of light and the second beam of light into the same direction. According to a further embodiment, the electronic beam shaping module can be activated by means of the control such that it shapes the first beam of light and the second beam of light in the same manner. According to a further embodiment, the electronic beam steering module and the electronic beam shaping module can be activated by means of the control such that they steer the first beam of light and the second beam of light shaped in the same manner into the same direction. According to a further embodiment, the control can be formed such that the first beam of light and the second beam of light are generated alternating with a frequency of at least 20 MHz.

According to yet another embodiment, a head light for a motor vehicle may comprise a first light source for generating a first beam of light of a first color; a second light source for generating a second beam of light of a second color; at least one third light source for generating a third beam of light of a third color; at least one of: an electronic beam steering module for steering the first beam of light, the second beam of light and the third beam of light and an electronic beam shaping module for shaping the first beam of light, the second beam of light and the third beam of light; and a control for such an activation of the first light source, the second light source and the third light source that the first beam of light, subsequently the second beam of light and subsequently the third beam of light are generated, wherein the sequence of the beams of light is repeated periodically.

According to a further embodiment, the electronic beam steering module can be activated by means of the control such that it steers the first beam of light, the second beam of light and the third beam of light into the same direction. According to a further embodiment, the electronic beam shaping module can be activated by means of the control such that it shapes the first beam of light, the second beam of light and the third beam of light in the same manner. According to a further embodiment, the electronic beam steering module and the electronic beam shaping module can be activated by means of the control such that they steer the first beam of light, the second beam of light and the third beam of light shaped in the same manner into the same direction. According to a further embodiment, the control can be formed such that the sequence of the beams of light is repeated periodically with a frequency of at least 20 MHz. According to a further embodiment, the superposition of the first beam of light, the second beam of light and the third beam of light may result in white light. According to a further embodiment, the first color can be red. According to a further embodiment, the second color can be yellow. According to a further embodiment, the third color can be blue.

BRIEF DESCRIPTION OF THE DRAWINGS

Further advantages and details result from the following description of exemplary embodiments.

DETAILED DESCRIPTION

Figure 1:
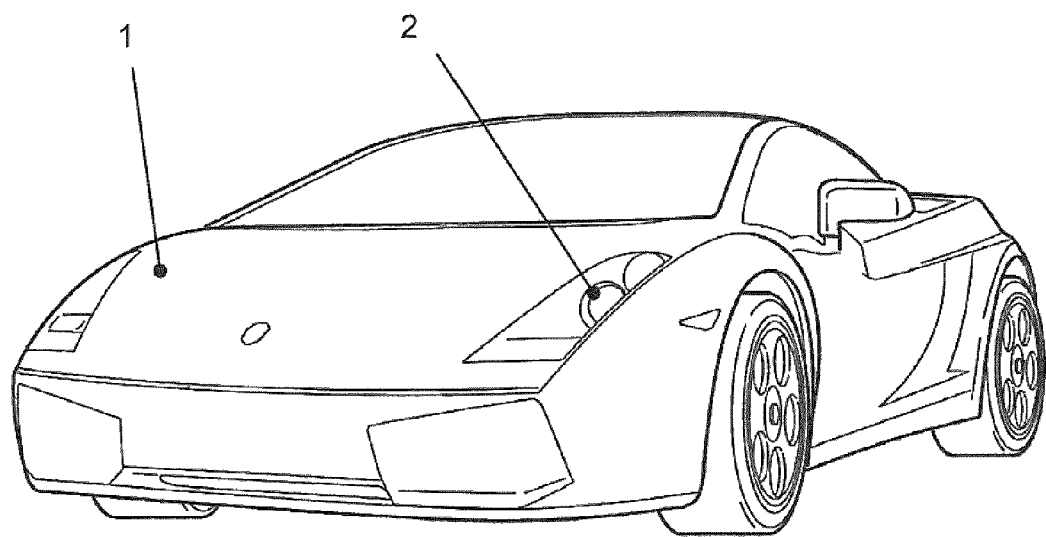
FIG. 1 shows an exemplary embodiment of a motor vehicle.

According to various embodiments, a head light for a motor vehicle may comprise a light source for generating a beam of light as well as a electronic beam steering module for steering the beam of light and/or a electronic beam shaping module for shaping the beam of light and wherein the head light comprises a light filter for eliminating at least the substantial portion of red light from the light generated by means of the light source.

In an embodiment the electronic beam steering module and/or the electronic beam shaping module has a performance wavelength which lies between the wavelength of green light and the wavelength of blue light. In a further embodiment the electronic beam steering module and/or the electronic beam shaping module has a performance wavelength which lies centered between the wavelength of green light and the wavelength of blue light. In a further embodiment the electronic beam steering module and/or the electronic beam shaping module has a performance wavelength which lies between 490 nm and 520 nm.

According to other embodiments, a head light for a motor vehicle may comprise a light source for generating a beam of light as well as a electronic beam steering module for steering the beam of light and/or a electronic beam shaping module for shaping the beam of light and wherein the electronic beam steering module and/or the electronic beam shaping module has a performance wavelength which lies between the wavelength of green light and the wavelength of blue light or between 490 nm and 520 nm.

In an embodiment the electronic beam steering module and/or the electronic beam shaping module has a performance wavelength which lies centered between the wavelength of green light and the wavelength of blue light.

According to other embodiments, a head light for a motor vehicle may comprise a first light source for generating a first beam of light of a first color, a second light source for generating a second beam of light of a second color, at least a third light source for generating a third beam of light of a third color as well as a electronic beam steering module for steering the first beam of light, the second beam of light and the third beam of light and/or a electronic beam shaping module for shaping the first beam of light, the second beam of light and the third beam of light and wherein a control for activating the first beam of light, the second beam of light and the third beam of light is provided such that the first beam of light, subsequently the second beam of light and subsequently the third beam of light are generated, wherein the sequence of the beams of light is repeated periodically.

In an embodiment the electronic beam steering module is activated by means of the control such that it guides the first beam of light, the second beam of light and the third beam of light into the same direction. In a further embodiment the electronic beam shaping module is activated by means of the control such that it shapes the first beam of light, the second beam of light and the third beam of light in the same manner. In a further embodiment the electronic beam steering module and the electronic beam shaping module are activated by means of the control such that they guide the first beam of light, the second beam of light and the third beam of light formed in the same manner into the same direction.

In a further embodiment the control is formed such that the sequence of the beams of light is repeated periodically with a frequency of at least 20 MHz.

In a further embodiment the superposition of the first beam of light, the second beam of light and the third beam of light results in white light. It is particularly provided for that the first color is red, yellow or blue, that the second color is red, yellow or blue, however, is different to the first color and that the third color is red, yellow or blue, however, is different to the first color and different to the second color.

According to yet other embodiments, a head light for a motor vehicle may comprise a first light source for generating a first beam of light of a first color and a second light source for generating a second beam of light of a second color as well as a electronic beam steering module for steering the first beam of light and the second beam of light and/or a electronic beam shaping module for shaping the first beam of light and the second beam of light and wherein a control is provided for activating the first light source and the second light source such that the first beam of light and the second beam of light are generated alternating.

In an embodiment the electronic beam steering module is activated by means of the control such that it guides the first beam of light and the second beam of light into the same direction. In a further embodiment the electronic beam shaping module is activated by means of the control such that it shapes the first beam of light and the second beam of light in the same manner. In a further embodiment the electronic beam steering module and the electronic beam shaping module are activated by means of the control such that they guide the first beam of light and the second beam of light formed in the same manner into the same direction.

In a further embodiment the control is arranged such that the first beam of light and the second beam of light are generated alternating with a frequency of at least 20 MHz.

A head light according to various embodiments in particular is an AFS and part of an AFS, respectively. A head light according to various embodiments in particular serves for illuminating of an area in front of a vehicle and a motor vehicle, respectively.

An electronic beam steering module according to various embodiments steers a beam of light in particular without a mechanical movement. An electronic beam shaping module according to various embodiments shapes a beam of light in particular without a mechanical movement. A steering of a beam of light according to various embodiments in particular means that a beam of light may be steered into different directions depending on a control signal. Different directions may in particular comprise right/left and up/down. A shaping of a beam of light according to various embodiments in particular means that the light cone and the beam of light, respectively, may assume different shapes depending on a control signal.

An electronic beam steering module according to various embodiments may for example also comprise so called Focal Plane Routing or Polarization Deflection. A beam steering module according to various embodiments (Focal Plane Routing) in particular comprises a pixelized Liquid Crystal Panel arranged between a mirror and a wire-grid polarizer. A beam steering module according to various embodiments may also comprise a stack of electro-polarizing filters, which in particular look like thin glass windows which have less than 1 mm in thickness. The resolution of the steering thereby may be adjusted by the number of electro-polarizing filters. An electro-polarizing filter according to various embodiments comprises a layer of a so called switchable liquid crystal polarization retarder and a layer comprising a so called switchable liquid crystal polarization grating.

A beam steering module according to various embodiments may for example comprise a LCoS or a LCD Panel, which in particular has a thickness of about 1 mm.

It is in particular provided for, that the electronic beam shaping module is arranged in front of the electronic beam steering module when viewed in the propagation direction of the beam of light. Suitable electronic beam steering modules and electronic beam shaping modules may be purchased from Boulder Nonlinear Systems Inc., USA. Further exemplary embodiments of electronic beam steering modules and electronic beam shaping modules are disclosed in WO 2007/122544 A1 the disclosure of which is hereby incorporated by reference.

The control and activation, respectively, of a beam steering module and a beam shaping module, respectively, may in particular be carried out depending on magnitudes as disclosed in WO 2007 122544 A1 (in particular see reference numerals 506, 507 and 508 in WO 2007/122544 A1). Thus, the activation of a beam steering module and/or of a beam shaping module may be carried out depending on an inclination of a roadway, a curvature of a roadway, a GPS signal and a positioning signal, respectively, and a signal of an interpretation of a camera image or the like.

A motor vehicle according to various embodiments in particular is a land craft available for individual use in road traffic. Motor vehicles according to various embodiments particularly are not limited to land crafts comprising internal combustion engines.

Figure 2:
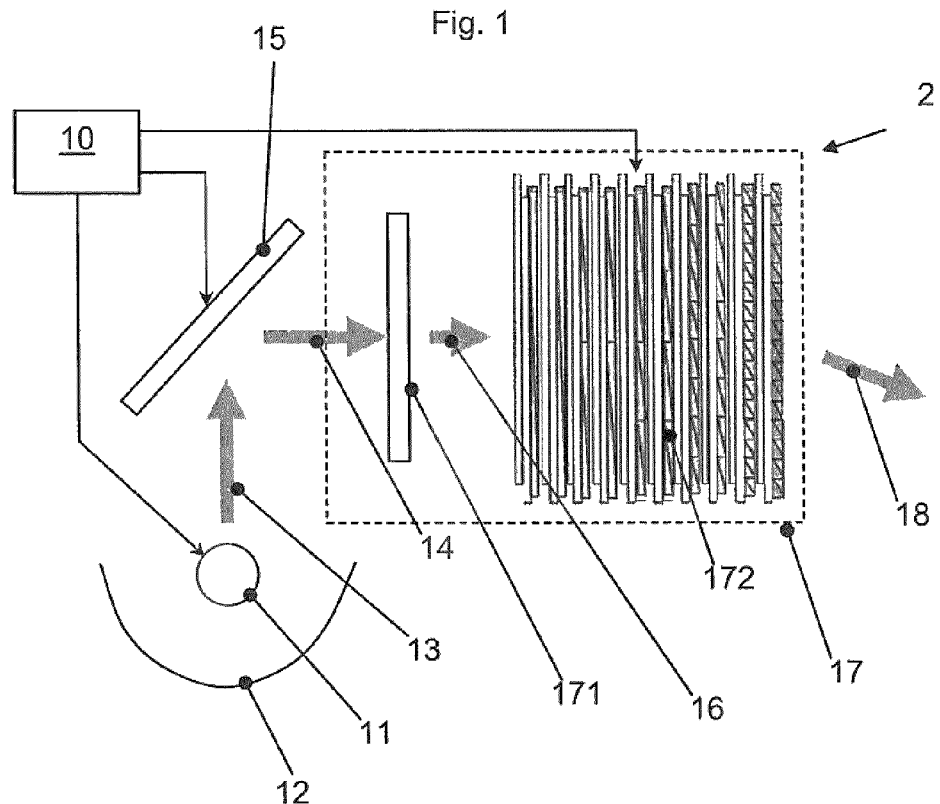
FIG. 2 shows an exemplary embodiment of a head light for the motor vehicle according to FIG. 1.

FIG. 1 shows an exemplary embodiment of a motor vehicle 1 comprising a head light 2 which is depicted in a schematic diagram in FIG. 2. Head light 2 comprises a light source 11 for generating a beam of light 13. Thereby in particular a reflector 12 for aligning the beam of light 13 may be provided. Head light 2 in addition comprises a beam shaping module 15 for shaping the beam of light 13. The result is a shaped beam of light 14.

Head light 2 in addition comprises a beam steering module 17 for steering the shaped beam of light 14. The beam of light steered and shaped accordingly is indicated using reference numeral 18. The beam steering module 17 comprises a λ/4 plate (45°) 171 for a circular polarization of the beam of light 14. The beam of light circularly polarized accordingly is indicated using reference numeral 16.

The beam steering module 17 in addition comprises a stack 172 of electro-polarizing filters, each of which looks like a thin glass window which is thinner than 1 mm. Thereby an increased steering resolution may be achieved by using several electro-polarizing filters. Each electro-polarizing filter comprises a layer of switchable liquid crystal polarization retarders and a layer of switchable liquid crystal polarization gratings. Thereby a serrated blazed grating is provided which is much thinner than a prism exhibiting the same deflection characteristics. In order to implement the serrated blazed grating in a "switchable" manner, birefringence materials, such as LC materials, comprising switchable diffraction indices are provided.

When a voltage waveform is applied to a LC layer the LC molecules arrange according to a serrated blazed grating structure. This is also known as Liquid Crystal (LC) polarization grating. A switchable liquid crystal polarization retarder causes that the polarization of light is delayed from clockwise, RCP, to counter-clockwise, LCP, or from counter-clockwise, LCP, to clockwise, RCP.

An electro-polarizing filter consists of a layer comprising a switchable liquid crystal polarization retarder and of a layer comprising a switchable liquid crystal polarization grating. When a switchable liquid crystal polarization retarder is integrated in front of a switchable liquid crystal polarization grating, the polarization of light may be controlled to be either RCP or LCP prior to passing through the polarization grating. Thus, the angle of deflection may be adjusted. Stack 172 of electro-polarizing filters comprises ten such filters and allows for a deflection of ±40° with a resolution of deflection of 1.25°, 2.5°, 5°, 10° or 15°.

Reference numeral 10 indicates a control for controlling the beam shaping module 15 and the beam steering module 17 as well as the light source 11, if applicable.

Figure 3:
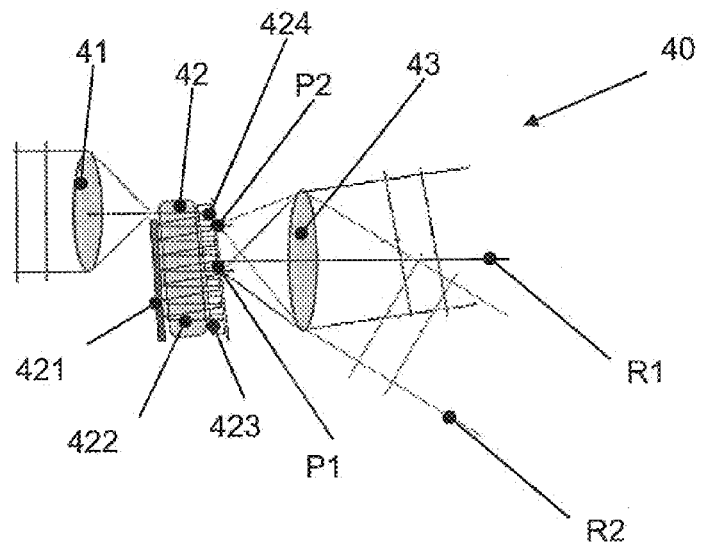
FIG. 3 shows an exemplary embodiment of a beam steering module.

FIG. 3 shows an alternative embodiment of a light steering module 40 for use in lieu of the beam steering module 17 of FIG. 2. Light steering module 40 comprises two convergent lenses 41 and 43 between which a focal plane router 42 is provided by means of which the so called focal point may be shifted. Thereby the focal plane router 42 comprises a LCD 423 arranged between a mirror 421 and a polarization grating 424. Arranged between the mirror 421 and the LCD 423 is a lens 422. By means of the LCD 423 it is controlled with which point the beam of light exits the focal plane router 42. By shifting the point at which the beam of light exits the focal plane router 42 from position P1 to position P2 the beam of light is steered from direction R1 to direction R2.

Figure 4:
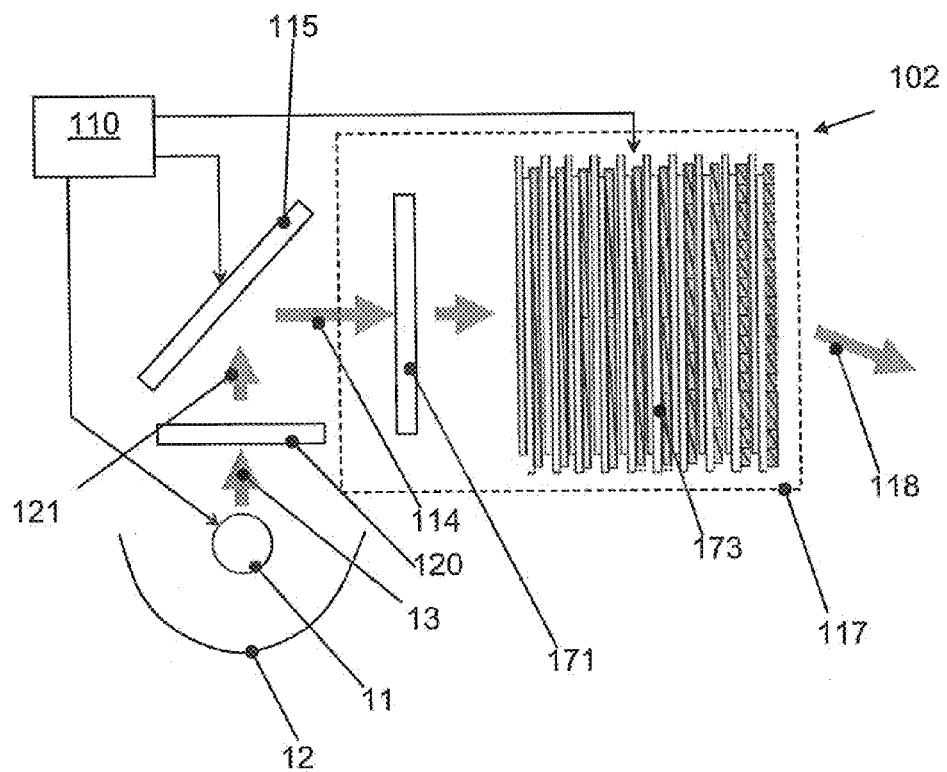
FIG. 4 shows an alternative exemplary embodiment of a head light.

FIG. 4 shows an alternative head light 102 for use in lieu of the head light 2. Thereby like reference numerals as used in FIG. 2 indicate like elements and objects, respectively. As a modification to the head light 2 according to FIG. 2 in the configuration of head light 102 a filter 120 is provided by means of which a substantial portion or a predominant portion of red light of the beam of light 13 is filtered out. The beam of light filtered accordingly is indicated using reference numeral 121 in FIG. 4.

The head light 102 comprises a light shaping module 115 analogous to light shaping module 15 whose operating range lies centered between blue and green light. The shaped beam of light is indicated by reference numeral 114. For steering the beam of light a light steering module 111 is provided which is analogous to the light steering module 17 but has a stack 173 of electro-polarizing filters which corresponds to the stack 72 of electro-polarizing filters, however, has an operating range which is centered between green and blue light. The filtered, shaped and deflected beam of light is indicated by reference numeral 118. The control 110 adapted accordingly, apart from the respective modifications, is in accordance with control 10. By means of the head light 102 it is feasible to avoid and to significantly reduce chromatic dispersion, respectively.

Figure 5:
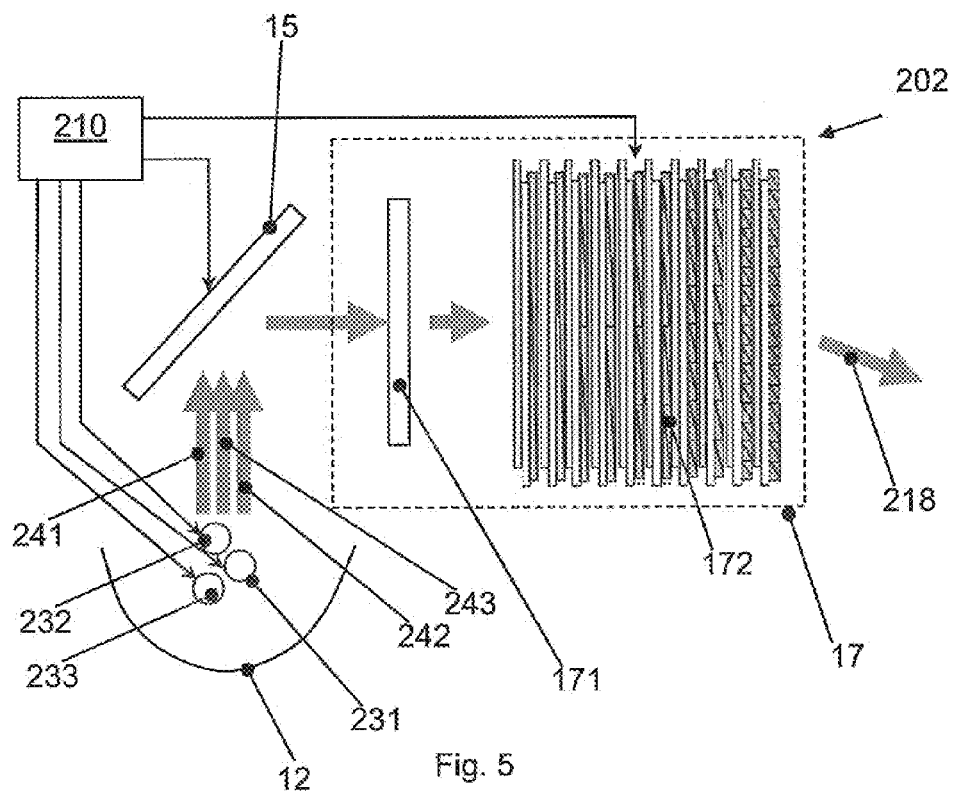
FIG. 5 shows a further alternative exemplary embodiment of a head light.

FIG. 5 shows a further alternative head light 202 for alternative use in lieu of head light 2. Thereby again, as in FIG. 2, like reference numerals indicate like and similar elements, respectively. In a modification of the head light 2 according to FIG. 2 it is provided for in the head light 202 according to FIG. 5 that the white light source 11 of head light 2 is substituted by three light sources 231, 232 and 233 which each emit a different color. Thereby it is provided for that the light source 231 emits red light, the light source 232 emits yellow light and the light source 233 emits blue light.

By means of the control 210 the light sources are switched one after the other and the switching sequence is repeated periodically, so that a red beam of light 241 emitted by light source 231 is replaced by a yellow beam of light 242 emitted by light source 232, this in turn is replaced by a blue beam of light 243 emitted by means of light source 233 and this in turn is replaced by the beam of light 241. Thus, a red beam of light 241, a yellow beam of light 242, a blue beam of light 243, a red beam of light 241, a yellow beam of light 242, a blue beam of light 243 and so forth is emitted. Thereby, the sequence of three different beams of light 241, 242 and 243 is repeated with a frequency of at least 20 MHz. By means of the control 210 the light shaping module 15 and the light steering module 17 are activated aligned with respect to the respective emitted color in such a manner that the beams of light 241, 242 and 243 equally shaped and equally steered exit as the beam of light 218.

Figure 6:
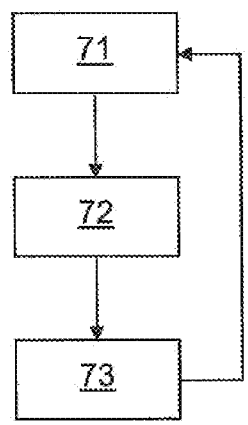
FIG. 6 shows an exemplary embodiment of a method for operating a head light according to FIG. 5.

FIG. 6 shows a method for operating the head light 202. Thereby, in a step 71 the light source 231 is switched on and the red beam of light 241 is emitted. The light shaping module 15 and the light steering module 17 are activated in an aligned manner with respect to the red light of the beam of light 241. Subsequently, the light source 231 is switched off and following step 71 is a step 72 in which the light source 232 is switched on so that the yellow beam of light 242 is emitted. Furthermore, by means of the control 210 the light shaping module 15 and the light steering module 17 are activated in an aligned manner with respect to the yellow light of the beam of light 242. Subsequently, the light source 232 is switched off and following step 72 is a step 73 in which the light source 233 is switched on so that the blue beam of light 243 is emitted. Furthermore, by means of the control 210 the light shaping module 15 and the light steering module 17 are activated in an aligned manner with respect to the blue light of the beam of light 243. The steps 71, 72 and 73 are repeated with a frequency of at least 20 MHz.

Figure 7:
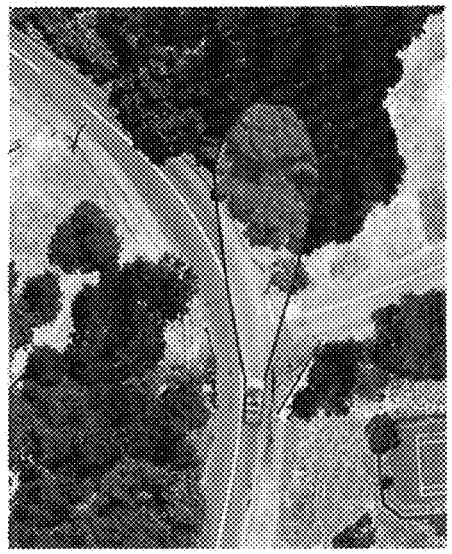
FIG. 7 shows a schematic diagram of a light cone of a conventional head light.

FIG. 7 in a schematic diagram shows the light cone of a conventional head light.

Figure 8:
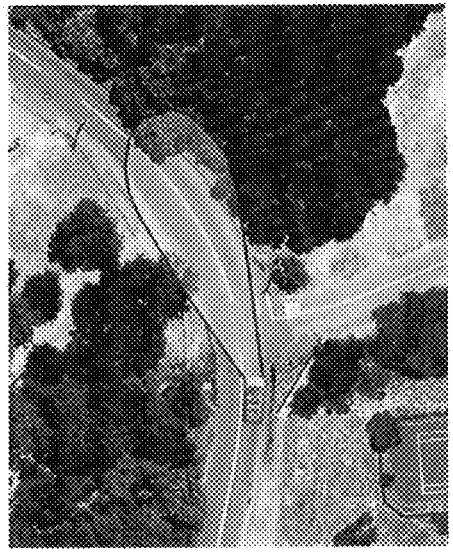
FIG. 8 in a schematic diagram shows an exemplary embodiment of a light cone when using a beam steering module.
Figure 9:
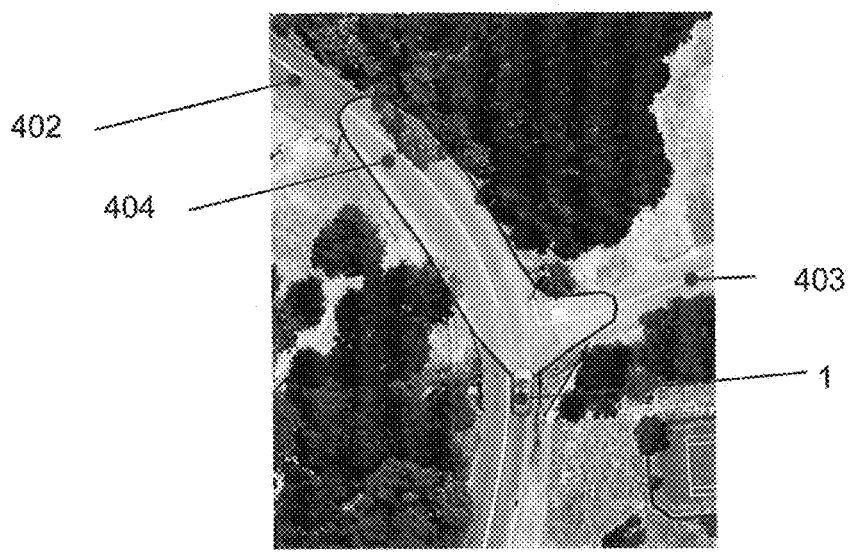
FIG. 9 in a schematic diagram shows an exemplary embodiment of a beam cone when using a beam steering module or a beam shaping module.

FIG. 8 shows the schematic diagram of a steered light cone, while FIG. 9 depicts a schematic diagram of a steered and shaped light cone 404 as it may be realized by means of the head lights 2, 102 and 202. Thereby it can be seen that in an advantageous manner the curved main road 402 on which the motor vehicle 1 is moving as well as also a portion of the branch road 203 are illuminated.

By means of light steering modules according to various embodiments, in particular by means of the light steering module 17 and the light steering module 117, respectively, it may be provided for that a beam of light also may be steered upwards and/or downwards.

REFERENCE NUMERALS 1 motor vehicle
2, 102, 202 head light
10, 110, 20 control
11, 231, 232, 233 light source
12 reflector
13, 14, 16, 18, 14, 118, 121, 241, 242, 243, 218 beam of light
15, 115 beam shaping module
17, 40, 117 beam steering module
41, 43 convergent lens
42 focal plane router
71, 72, 73 step
120 filter
171 λ/4 plate
172, 173 stack of electro-polarizing filters
402 main road
403 branch road
404 light cone
423 mirror
424 lens
423 LCD (liquid crystal display)
424 polarization grating
P1, P2 position
R1, R2 direction

What is claimed is:

1. A head light for a motor vehicle comprising:
a light source for generating a beam of light;
a red light filter for eliminating at least the substantial portion of red light, but not green light or blue light, from the light generated by the light source; and
an electronic beam steering module arranged downstream of the red light filter and comprising one or more electrically controllable liquid crystal layers configured to steer the filtered light beam in different directions depending on a received control signal without mechanical movement, wherein the electronic beam steering module has a performance wavelength which lies between the wavelength of green light and the wavelength of blue light such that the electronic beam steering module is specifically configured for steering the light filtered by the red light filter.

2. The head light according to claim 1, wherein the electronic beam steering module has a performance wavelength which lies centered between the wavelength of green light and the wavelength of blue light.

3. The head light according to claim 1, further comprising an electronic beam shaping module having a performance wavelength which lies between the wavelength of green light and the wavelength of blue light.

4. A device according to claim 3, wherein the electronic beam shaping module has a performance wavelength which lies centered between the wavelength of green light and the wavelength of blue light.

5. The head light according to claim 3, wherein the electronic beam shaping module has a performance wavelength which lies between 490 nm and 520 nm.

6. The head light according to claim 1, wherein the electronic beam steering module has a performance wavelength which lies between 490 nm and 520 nm.

7. The head light according to claim 1, wherein the electronic beam steering module comprises a pixilated liquid crystal panel arranged between a mirror and a wire-grid polarizer.

8. The head light according to claim 1, wherein the electronic beam steering module comprises a stack of electro-polarizing filters, each electro-polarizing filter comprising a layer of switchable liquid crystal polarization retarder and a layer of switchable liquid crystal polarization grating.

9. A head light for a motor vehicle comprising:
a light source for generating a beam of light;
a red light filter for eliminating at least a substantial portion of red light, but not green light or blue light, from the light generated by the light source;
an electronic beam steering module comprising one or more electrically controllable liquid crystal layers for steering the filtered beam of light in different directions depending on a received control signal without mechanical movement, wherein the electronic beam steering module has a performance wavelength which lies between 490 nm and 520 nm such that the electronic beam steering module is specifically configured for steering the light filtered by the red light filter; and
an electronic beam shaping module for shaping the beam of light; wherein the electronic beam shaping module has performance wavelength which lies between 490 nm and 520 nm.

10. A head light for a motor vehicle comprising:
a first light source for generating a first beam of light of a first color;
a second light source for generating a second beam of light of a second color;
at least one of: an electronic beam steering module for steering the first beam of light and the second beam of light and an electronic beam shaping module for shaping the first beam of light and the second beam of light; and
a control for such an activation of the first light source and the second light source that the first beam of light and the second beam of light are generated alternatingly;
wherein the electronic beam steering module is activated by means of the control such that it steers the first beam of light and the second beam of light into the same direction.

11. The head light according to claim 10, wherein the electronic beam shaping module is activated by means of the control such that it shapes the first beam of light and the second beam of light in the same manner.

12. The head light according to claim 10, wherein the electronic beam steering module and the electronic beam shaping module are activated by means of the control such that they steer the first beam of light and the second beam of light shaped in the same manner into the same direction.

13. The head light according to claim 10, wherein the control is formed such that the first beam of light and the second beam of light are generated alternating with a frequency of at least 20 MHz.

14. A head light for a motor vehicle comprising:
a first light source for generating a first beam of light of a first color;
a second light source for generating a second beam of light of a second color;
at least one third light source for generating a third beam of light of a third color;
at least one of: an electronic beam steering module for steering the first beam of light, the second beam of light and the third beam of light and an electronic beam shaping module for shaping the first beam of light, the second beam of light and the third beam of light; and
a control for such an activation of the first light source, the second light source and the third light source that the first beam of light, subsequently the second beam of light and subsequently the third beam of light are generated, wherein the sequence of the beams of light is repeated periodically;
wherein the electronic beam steering module is activated by means of the control such that it steers the first beam of light, the second beam of light and the third beam of light into the same direction.

15. The head light according to claim 14, wherein the electronic beam shaping module is activated by means of the control such that it shapes the first beam of light, the second beam of light and the third beam of light in the same manner.

16. The head light according to claim 14, wherein the electronic beam steering module and the electronic beam shaping module are activated by means of the control such that they steer the first beam of light, the second beam of light and the third beam of light shaped in the same manner into the same direction.

17. The head light according to claim 14, wherein the control is formed such that the sequence of the beams of light is repeated periodically with a frequency of at least 20 MHz.

18. The head light according to claim 14, wherein the superposition of the first beam of light, the second beam of light and the third beam of light results in white light.

19. The head light according to claim 14, wherein the first color is red.

20. The head light according to claim 14, wherein the second color is yellow.

21. The head light according to claim 14, wherein the third color is blue.

* * * * *